(12) United States Patent
Frankel et al.

(10) Patent No.: US 7,817,601 B1
(45) Date of Patent: Oct. 19, 2010

(54) SYSTEM AND METHOD FOR SEAMLESS COMMUNICATION SYSTEM INTER-DEVICE TRANSITION

(75) Inventors: Jason A. Frankel, Lincoln, CA (US); John David Conley, Fair Oaks, CA (US); Christopher Lee Mullins, Lincoln, CA (US)

(73) Assignee: Coversant Corporation, Roseville, CA (US)

( * ) Notice: Subject to any disclaimer, the term of this patent is extended or adjusted under 35 U.S.C. 154(b) by 916 days.

(21) Appl. No.: 11/561,358

(22) Filed: Nov. 17, 2006

(51) Int. Cl.
*H04J 3/16* (2006.01)

(52) U.S. Cl. .................. 370/331; 370/332; 455/436; 455/438; 455/439

(58) Field of Classification Search .......... 370/252, 370/253, 230, 354, 355, 356, 389, 401, 299, 370/331, 332; 455/455, 336, 552.1, 438, 455/436, 439, 445; 715/706, 853, 854, 752; 709/209, 223, 216; 345/758, 757, 473; 463/31
See application file for complete search history.

(56) References Cited

U.S. PATENT DOCUMENTS

| | | | |
|---|---|---|---|
| 5,822,418 A | 10/1998 | Yacenda et al. | |
| 6,738,809 B1 * | 5/2004 | Brisebois et al. | 709/224 |
| 6,785,229 B1 * | 8/2004 | McNiff et al. | 370/230 |
| 7,086,005 B1 * | 8/2006 | Matsuda | 715/706 |
| 7,248,677 B2 | 7/2007 | Randall et al. | |
| 2003/0177269 A1 | 9/2003 | Robinson et al. | |
| 2004/0059580 A1 | 3/2004 | Michelson et al. | |
| 2004/0073643 A1 | 4/2004 | Hayes et al. | |
| 2005/0144255 A1 | 6/2005 | Hennecke | |
| 2006/0159047 A1 * | 7/2006 | Olvera-Hernandez et al. | 370/331 |
| 2006/0224589 A1 | 10/2006 | Rowney et al. | |
| 2006/0271953 A1 | 11/2006 | Jacoby et al. | |
| 2007/0116194 A1 | 5/2007 | Agapi et al. | |
| 2008/0005238 A1 | 1/2008 | Hall et al. | |
| 2008/0215994 A1 * | 9/2008 | Harrison et al. | 715/757 |
| 2009/0262668 A1 | 10/2009 | Hemar et al. | |
| 2010/0036717 A1 | 2/2010 | Trest | |

OTHER PUBLICATIONS

"The Power of Presence," white paper published by Jabber, Inc., 2006, 10 pages.
Derwent-Acc-No: 2006-669274 Bothwell et al., Accessed on Jul. 16, 2010, East Version: 2.4.1.1, Priority Data: Feb. 14, 2005, 3 pgs.

* cited by examiner

*Primary Examiner*—Jean A Gelin
(74) *Attorney, Agent, or Firm*—Fulbright & Jaworski L.L.P.

(57) ABSTRACT

By modifying the communication endpoints to be presence aware and connecting them to a presence network, communication connections can be created wherein networks are added, or dropped, from the connection in order to keep the connection seamless from the perspective of the parties to the communication session. In one embodiment, an initiating user initiates a communication session on a first network (for example, a cellular network) to a target user served by a second network. During the communication session, the initiating user moves from his/her car to a landline and the communication session is transferred to a plain old telephone system (POTS) network. In one embodiment, on the target user's communication device an avatar representing the initiating user is updated to reflect that a landline network has been substituted for the cellular network.

17 Claims, 2 Drawing Sheets

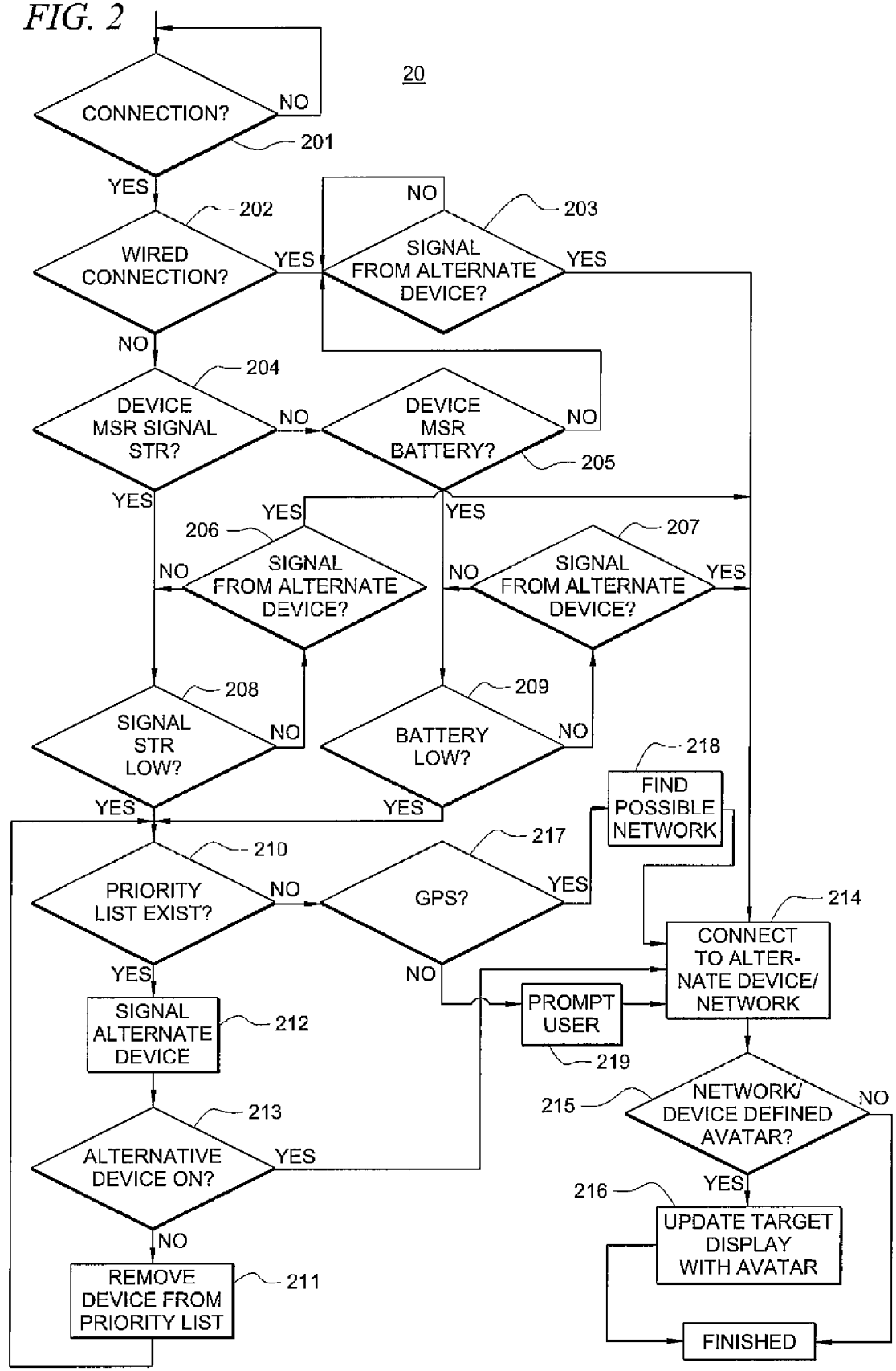

SYSTEM AND METHOD FOR SEAMLESS COMMUNICATION SYSTEM INTER-DEVICE TRANSITION

CROSS-REFERENCE TO RELATED APPLICATIONS

The present application is related to concurrently filed, co-pending, and commonly-assigned U.S. patent application Ser. No. 11/561,207, entitled "SYSTEM AND METHOD FOR INDICATING A TARGET USER'S PRESENCE"; U.S. patent application Ser. No. 11/561,370, entitled "SYSTEM AND METHOD FOR FACILITATING COMMUNICATION CAPABILITY AMONG DISPARATE ENDPOINT COMMUNICATION DEVICES"; and U.S. patent application Ser. No. 11/561,229, entitled "COMMUNICATION CONNECTION ROUTING USING PRESENCE SERVERS," the disclosures of which are hereby incorporated herein by reference.

TECHNICAL FIELD

This invention relates to information transfer systems and more particularly to systems and methods where user's interact electronically and wherein the current presence of the user dictates the information transfer network used.

BACKGROUND OF THE INVENTION

It is now common practice for people to have a multiplicity of communication devices used for interaction with each other. Initially, such devices provided voice communication tied to specific locations over analog lines. Now voice, as well as data, is communicated in digital format over sophisticated data packet networks. Some of these data packet networks operate wirelessly, allowing a user to send and receive voice or data packets from any physical location in the network. Thus, a user having some type of system (such as a cell phone, computer, or the like) can make contact through an electronic network with a target user's electronic system with the intent to transfer information between the systems.

In some situations this information transfer is as simple as a voice communication between the calling user and the target user using a cell phone. In other situations the calling user (or a system under the control of a calling user) may wish to obtain information from a database of another user. An example of such usage would be by using a browser on the Internet to search for, and download, data from a remote source.

Often in these types of electronic communications, the user and/or the target may travel from one location to another (such as from home to office). Sometimes the calling party will terminate the connection in order to employ a different network in a certain location, either as a function of convenience, economy or network availability. Thus, the party would terminate the connection on one network and, after a brief delay, create a new connection between the same parties using a separate network. Likewise, a target party could be traveling while connected and may also require the use of a different network during said travel.

As described above, connections between the parties are specific to the networks used by the parties when the connection is initiated, requiring termination of the existing connection before recreating that connection on a different network. However, as communication becomes more ubiquitous, and devices more numerous, it would be desirable for connections to move seamlessly from network to network while traveling (from landline home phone to cell phone to cellular car phone, for example) and presently, except for the ability to move between individual cells of a cellular network, this ability to move seamlessly between different networks is lacking.

BRIEF SUMMARY OF THE INVENTION

By modifying the communication endpoints to be presence aware and connecting them to a presence network, communication connections can be created wherein networks are added, or dropped, from the connection in order to keep the connection seamless from the perspective of the parties to the communication session. In one embodiment, an initiating user initiates a communication session on a first network (for example, a cellular network) to a target user served by a second network. During the communication session, the initiating user moves from his/her car to a landline and the communication session is transferred to a plain old telephone system (POTS) network. In one embodiment, on the target user's communication device an avatar representing the initiating user is updated to reflect that a landline network has been substituted for the cellular network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 shows one embodiment of a flow chart detailing one method used in the session of FIG. 1.

DETAILED DESCRIPTION OF THE INVENTION

Figure 1:
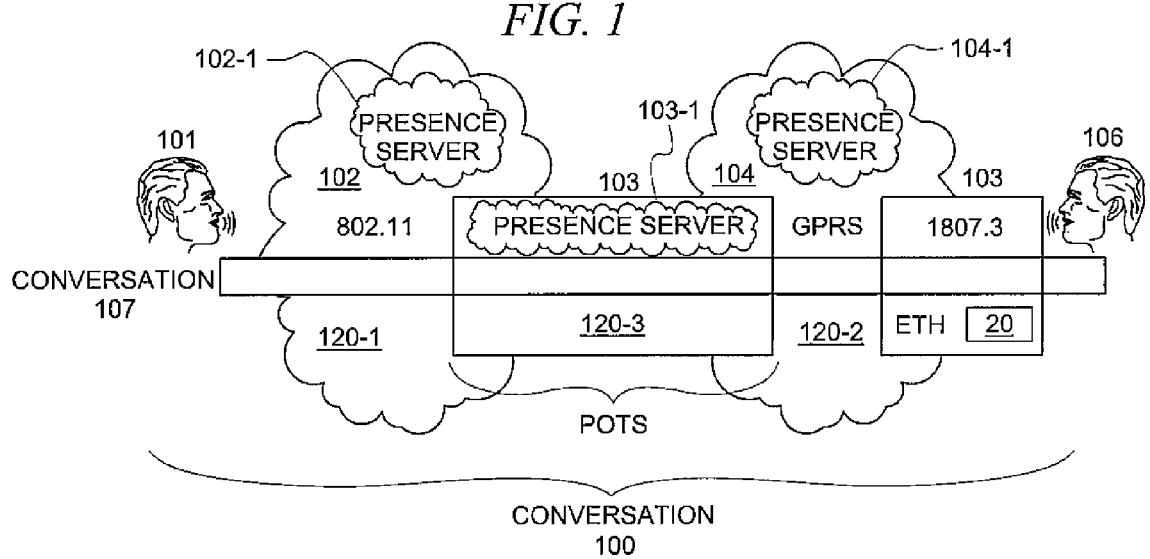
FIG. 1 shows a communication session between an initiating user and a target user using the apparatus and methods of an embodiment of the invention.

FIG. 1 shows a communication session, such as communication session 107 (in this case conversation), between initiating user 101 and target user 106. This conversation continues, uninterrupted while initiating user 101 and target user 106 move between different wired and wireless networks and/or between networks having different protocols.

In this embodiment, the initiating user initiates communication session 107 on wireless Ethernet network 102. Processors 120-1 and 120-2 respond to signals from initiating user 101 or target user 106 for switching communication session 107 from one in-range network to the next. In the embodiment shown, initiating user 101 moves next to wired network 103. Network 103 contains processor 120-3 to allow communication session 107 to be moved from original wireless Ethernet network 102 to telephone network 103. This can be, for example, a signal sent from processor 120-3 to processors 120-1 and 120-2 under control of the presence servers. One example of a presence server is discussed in a white paper available from Jabber, Inc., located at http://www.jabber.com/index.cgi?CONTENT ID=921, which white paper is incorporated by reference herein.

Next, the initiating user moves from wired telephone network 103 to cellular general packet radio service network (GPRS) 104 (or to any other network). Again, in this embodiment, signals indicating that communication session 107 is to be transferred are sent from current network 103 to transfer network 104 under control of the presence servers. Similarly, target user 106 could have made similar movements between networks without disrupting communication session 107.

One or more presence servers, such as servers 102-1, 103-1, and 104-1, are connected to the networks (or connected individually to respective stations). There servers maintain the status (as well as other operational parameters) of each user device and operate to communicate this status to other devices as necessary.

FIG. 2 illustrates one embodiment 20 for enabling processor 120-1 (120-2 and 120-3) to determine when and where to transfer communication session 107. Embodiment 20 operates in conjunction with the presence servers and keeps track of the current presence of each user. Assume that communication session 107 has been established between party 101 and party 106 in any manner know in the art. Once communication session 107 is initialized, as determined by process 201, process 201 determines whether the communication device, such as connection device 30 (FIG. 3), is connected to a wired or wireless network. For a wired network, process 20 waits until such time as a signal arrives from an alternate network, such as network 103.

Once such a signal has been received, process 214 transfers communication session 107 from the present network (for example, 103) to the transfer network (for example, 104). Upon receipt of a communication session, process 215 could, if desired, determine whether or not a user's communication device contains an avatar image corresponding to transfer network 103. If so, process 216 updates the target user's display to show the updated avatar.

A determination by process 202 that the current communication session is not a wired connection presents different issues, such as, for example, diminished battery life (measured by sensor 303, FIG. 3) and decreased signal strength (measured by sensor 305, FIG. 3) may necessitate transfer to another network. Processes 204 and 205 determine if a "forced" change is now necessary and, if so, processes 208, 209, 210, 217, 218, 219, 212, 213 and 211 control the connection to a new network via process 214. Process 210 controls which network, out of a list of networks, is the next network to try on low signal detection. For low battery, a wired network would be a preference. Process 217 and process 218 find a network based on location of the device with process 219 prompting the user to accept or reject the selection. Process 212 signals the transfer network apparatus to determine if the communication device connected to that network is available. Processes 206 and 207 determine if a signal from an alternate network is available and if the user desires to transfer to that network. If so, process 214 is invoked. This transfer signal could be generated by the initiating user or the target user using the communication device keypad or it could be generated with no user input.

Figure 3:
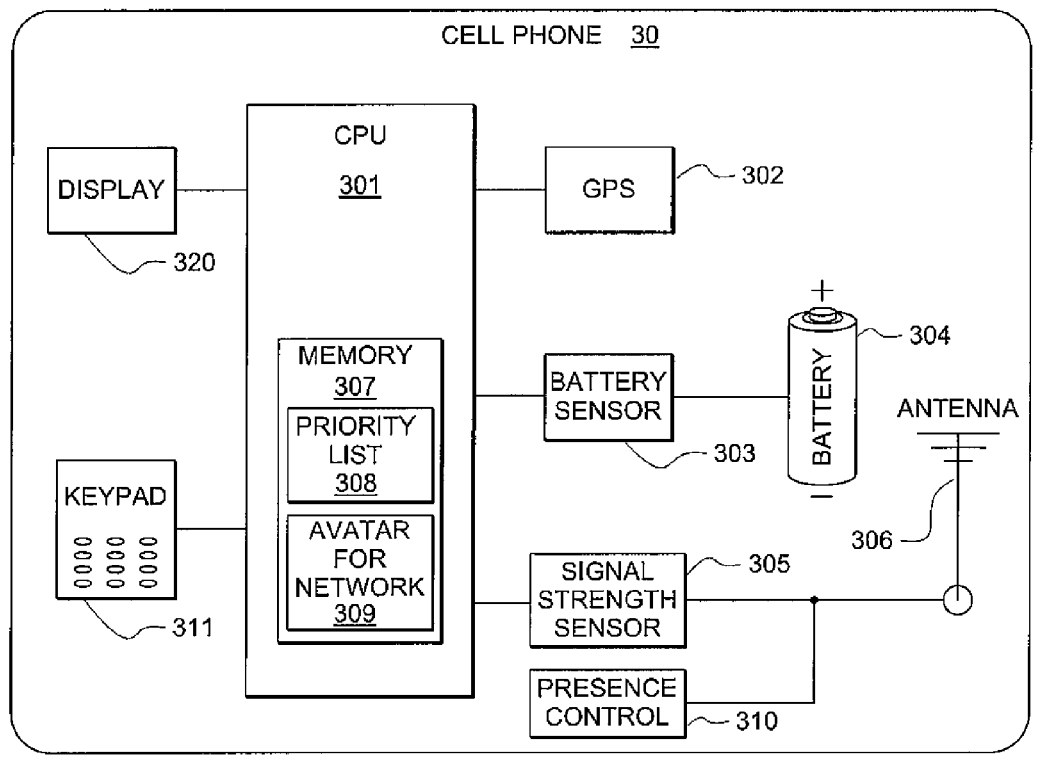
FIG. 3 shows one embodiment of a block diagram of a communication device in accordance with the concepts of the invention.

FIG. 3 illustrates one embodiment 30 of a communication device (in this example, it is a cellular phone) having CPU (processor) 301, GPS 302, low battery sensor 303, battery 304, signal strength sensor 305, antenna 306, memory 307 containing priority list 308, ad avatars 309, and having display 320 and keypad 311. Any communication device can be used with the concepts discussed herein.

If desired, device 30 can have a local presence control, such as presence control 310, which operates in conjunction with presence controls in other devices and/or in conjunction with presence servers (such as servers 102-1, 103-1, 104-1) in order to assist in controlling the movement of the device between networks. In one embodiment, the signal to begin the network change would come from the endpoint itself, which is connected to the presence network. The signal says, "I'm this resource now", which tells the presence network which network the connection should move to. A priority list controls the movement between networks and this list can be maintained by the presence network to which the user is attached.

All of the devices are continually connected to a presence network that keeps track of the priority and availability of the devices. As the devices change priority, the presence network is able to redirect conversation flow over the new devices.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication system comprising:
    a plurality of networks each operable for controlling communication connections between calling and called users;
    means for establishing a communication session from a calling user to a called user via a particular one of said networks;
    means including a presence network for determining when at least one of either said calling user or said called user desires to be transferred to a different network to continue said established communication session;
    means responsive to a determined desire for transferring said desiring user to a different network while maintaining said communication session without disruption; and
    means for causing an avatar of a user as said avatar appears to another user during a communication session to reflect at least one of the current networks controlling said communication session.

2. The communication system of claim 1 wherein said plurality of networks are selected from the list of: wireline, cellular, VoIP, WiFi, Bluetooth, Ethernet, (Infiniband), wireless USB, home phoneline network (HPNA), homeplug (powerline network), general packet radio service (GPRS), iEEE-1394 (firewire).

3. The communication system of claim 2 wherein said determining means is a signal initiated by said user.

4. The communication system of claim 2 wherein said determining means comprises a signal from a priority list maintained by said presence network.

5. The communication system of claim 4 wherein said signal is generated without user involvement.

6. The communication system of claim 1 wherein said avatar is determined by a pre-defined graphic created by the user.

7. A method for use in interactive electronic communications, said method comprising:
   providing data indicative of the necessity to transfer an existing electronic communication between communicating parties from one network to another network, said networks being managed independently from each other said data coming from at least one presence server associated with a communication network;
   transferring said connection from said existing network to said another network based at least in part on said provided data, said transfer occurring without disrupting said communication between said parties; and
   causing an avatar of a party, as said avatar appears to said other party, to reflect the transfer network.

8. The method of claim 7 wherein said transfer is initiated by a signal generated by one of said parties.

9. The method of claim 7 wherein said transfer is initiated by a signal generated by one of said presence servers.

10. The method of claim 7 wherein said parties are connected to different networks and said transfer of networks is with respect to only one of said parties.

11. The method of claim 7 wherein said providing data comprises:
   the selection of a transfer network based at least in part on a priority list maintained by at least one of said presence servers.

12. The method of claim 7 wherein said avatar is determined by a pre-defined graphic created by said party.

13. Apparatus for use in interactive electronic communications, said apparatus comprising:
   a plurality of networks capable of supporting a communication session between a calling user on one of said networks and a target user on the same or on another of said networks;
   a plurality of communication devices capable of attaching to said networks;
   a presence network operable for exchanging presence data pertaining to communication devices attached to said network;
   a processor operable while at least two communication devices are being supported in a communication session for controlling the transfer of at least one of said communication devices to a different one of said networks;
   wherein said processor is further operable for causing an avatar of a user of said transferring device, as said avatar appears to another user on said communication device during a communication session to reflect at least one of the current networks controlling said communication session.

14. The apparatus of claim 13 wherein said plurality of networks are selected from the list of: wireline, cellular, VoIP, WiFi, Bluetooth, Ethernet, (Infiniband), wireless USB, home phoneline network (HPNA), homeplug (powerline network), general packet radio service (GPRS), IEEE-1394 (firewire).

15. The apparatus of claim 13 wherein said processor is activated by a signal generated by said transferring communication device.

16. The apparatus of claim 13 wherein said processor is activated without intervention by any of said communication devices.

17. The apparatus of claim 13 wherein said transfer is controlled, at least in part, by priorities contained in said presence network.

* * * * *